US007624023B2

(12) United States Patent  
Clay et al.

(10) Patent No.: US 7,624,023 B2
(45) Date of Patent: Nov. 24, 2009

(54) CLIENT OPPORTUNITY MODELING TOOL

(75) Inventors: Robert R. Clay, Madison, MS (US); Robyn Ruth Levine, Chicago, IL (US); David A. Shuster, New Albany, OH (US); Kevin R. Wyne, Peoria, IL (US)

(73) Assignee: International Business Machines Corporation, Armonk, NY (US)

( * ) Notice: Subject to any disclaimer, the term of this patent is extended or adjusted under 35 U.S.C. 154(b) by 1674 days.

(21) Appl. No.: 10/162,782

(22) Filed: Jun. 4, 2002

(65) Prior Publication Data
US 2003/0225591 A1 Dec. 4, 2003

(51) Int. Cl.
*G06Q 99/00* (2006.01)
(52) U.S. Cl. .......................................................... 705/1
(58) Field of Classification Search ....................... 705/1
See application file for complete search history.

(56) References Cited

U.S. PATENT DOCUMENTS

| 4,075,657 | A |   | 2/1978  | Weinblatt ................... 358/93   |
| 5,377,100 | A | * | 12/1994 | Pope et al. .................. 600/545  |
| 5,410,609 | A |   | 4/1995  | Kado et al. ..................... 382/2 |
| 5,537,132 | A |   | 7/1996  | Teraoka et al. ............... 345/133  |
| 5,731,805 | A |   | 3/1998  | Tognazzini et al. .......... 345/156   |
| 5,767,897 | A | * | 6/1998  | Howell ..................... 348/14.07  |
| 5,831,594 | A |   | 11/1998 | Tognazzini et al. .......... 345/156   |
| 5,886,683 | A |   | 3/1999  | Tognazzini et al. .......... 345/146   |
| 5,898,423 | A | * | 4/1999  | Tognazzini et al. .......... 345/158   |
| 6,102,870 | A |   | 8/2000  | Edwards ....................... 600/558 |
| 6,106,119 | A |   | 8/2000  | Edwards ....................... 351/209 |
| 6,873,710 | B1 | * | 3/2005  | Cohen-Solal et al. ........ 382/100   |
| 6,967,674 | B1 | * | 11/2005 | Lausch ......................... 348/143 |
| 7,027,621 | B1 | * | 4/2006  | Prokoski ...................... 382/118  |
| 2001/0011211 | A1 |   | 8/2001  | Bushey et al. ................. 703/22  |
| 2002/0083025 | A1 | * | 6/2002  | Robarts et al. ................. 706/12 |
| 2003/0021601 | A1 | * | 1/2003  | Goldstein .................... 396/263   |
| 2003/0052911 | A1 | * | 3/2003  | Cohen-solal ................. 345/738   |
| 2003/0126013 | A1 | * | 7/2003  | Shand .......................... 705/14   |

FOREIGN PATENT DOCUMENTS

GB 2379987 A * 3/2003

OTHER PUBLICATIONS

Crowe et al., "Comparing Interfaces Based On what Users Watch And Do," Proceedings Of The First ACM Symposium On Eye Tracking Research & Applications, Association Of Computing Machinery (ACM), 2000, pp. 29-36.

(Continued)

*Primary Examiner*—Jonathan Ouellette
(74) *Attorney, Agent, or Firm*—John Pivnichny

(57) ABSTRACT

A business opportunity proposal is presented on a display device to a client. A business modeling capability installed on a computing device has parameters which can be altered to show calculations such as ROI relating to the business opportunity. An image capture device captures an image or video stream of the client during the presentation. Attentive technology software analyzes the image. Eye movement, facial expression, gestures and body motion in the image to detect a cued event situation. Parameters in the business modeling capability are altered during the presentation in response to the analyzing in order to more effectively communicate and reach agreement with the client on the proposal.

18 Claims, 2 Drawing Sheets

OTHER PUBLICATIONS

Nielsen, "Noncommand User Interfaces," Communication of the ACM, Apr. 1993, vol. 36, No. 4, pp. 83-99.

Http://www.acm.org/sigchi/chi97/proceedings/short-talk/nhn.htm, Narayanan et al., Model-Based Design Of Hypermedia, Presentations p. 1-5.

Http://www.eng.auburn.edu/csse/research/...oups/vi13rg/docs/narayanan-chi-99-ws.html, Narayanan, "Exploiting Gaze Data For The Analysis and Synthesis Of Visual Interactions," pp. 1-2.

Narayanan et al., "Extending Eye Tracking To Analyze Interactions With Multimedia Information Presentations," People And Computer XIV-Usability Or Else Proceedings Of HCI2000, London UK, 2000 (abstract only).

IBM Technical Disclosure Bulletin, Self-Describing Animated Icons For Human-Computer Interaction, vol. 33, No. 7, Dec. 1990, pp. 425-427.

"IBM To Unveil Biometric Pact," by K. Delaney and P. Prada, *The Wallstreet Journal*, Apr. 25, 2002, p. D-5.

"IBM Looks Airline Security In The Eye Signs Agreement With Schiphol Group To Bring Biometric Iris Scanning System To Airlines And Airports," IBM Corporation Press Release, Apr. 25, 2002, pp. 1-3.

* cited by examiner

CLIENT OPPORTUNITY MODELING TOOL

TECHNICAL FIELD

The invention relates to systems and methods for making business opportunity presentations to potential customers in general. More specifically, the invention relates to systems and methods of modeling financial returns for a proposed business opportunity and optimizing the model in response to unspoken feedback from the client.

BACKGROUND OF THE INVENTION

A business opportunity may be offered to a client in the form of a presentation. The client is a potential customer or current customer of the party making the presentation. The purpose of the presentation is to convince the client to take advantage of the benefits of the business opportunity by purchasing the services or products of the presenting party. If the client is a current customer, then the presenting party attempts to receive additional purchases from the client associated with the business opportunity which is being presented.

The presenting party may be a single individual making an offering of services or products. The presenting party may also be an agent representing another individual, firm, or a large company. Often the presenting party is a team of individuals employed by or representing a large company having a broad spectrum of services and products available for purchase by the client.

The client may also be a single individual, or a team of people who will view and evaluate the business opportunity for a client. Often one or just a few people on the client team will be the key decision maker(s).

The presentation may be either a single meeting or as is more often the case, will comprise several presentation sessions, each covering various aspects of the business opportunity, and each with differing members of the presenting and client teams participating. One aspect of a business opportunity which may be a subject of one or more presentation sessions is a business model of the opportunity including, for example a return on investment (ROI) calculation.

ROI calculations are well known in the business and accounting arts. For example, ROI is described as a ratio of income to investment in *Managerial Accounting* by Morse and Zimmerman, Irwin McGraw-Hill, Boston 1997, page 477. Calculations for other measures of a business opportunity are also described by Morse and Zimmerman such as internal rate of return (IRR) and net present value (NPV). Certain input values are chosen such as expenditures to be made at certain points in time and expected revenues to be received at other points in time. The expenditures typically represent investments to be made by the client in the business opportunity, including purchases of the presenting party's offerings. The revenues typically represent expected sales from the client based on the investments to the client's customers or potential customers.

Various assumptions may be made about costs, prices, volumes, and other parameters of the opportunity. Financial assumptions are also made about, for example, financing alternative costs, or time value of money. An ROI may then be calculated. Other calculations may also be made such as various break even points, pay back periods, IRR, or NPV.

Although calculators and interest rate tables have been used for such calculations in the past, the use of spreadsheet software tools is now more common. A spreadsheet shall be understood herein to mean a software tool having a two dimensional array of cells in which a user may enter data or formulas in the cells to facilitate entry, calculating results, and recording values. Some spreadsheets permit data of nearly any type to be entered in a cell including a number, a mathematical formula, alphanumeric variable, text, a graphic, an audio or video clip, or an object of any type such as known in the object oriented programming arts. LOTUS 1-2-3® (LOTUS 1-2-3 is a trademark of Lotus Development Corporation, Cambridge, Mass. and EXCEL® (EXCEL is a trademark of Microsoft Corp., Redmond, Wash.) are examples of spreadsheet software currently available which may be used for such calculations.

Independent of the above techniques, various methods have been developed to measure how people respond to information presented on a computer screen. For example, Edwards in U.S. Pat. No. 6,106,119 describes recording eye tracking data of a test person viewing scenarios and virtual pages. The recorded data is then analyzed to determine, for example, the sequence in which the test person views various items on a virtual page, or mental states (e.g. reading a block). The sequence or mental state may be superimposed on the virtual page, for further study. The mental states are deduced from patterns of elementary eye tracking data such as fixations and saccades using methods described in Edwards' U.S. Pat. No. 6,102,870.

Tognazzini et al. in U.S. Pat. Nos. 5,731,805, 5,831,594, 5,866,683, and 5,898,423 describe monitoring the gaze position of a computer user, and selecting information to be displayed based on the gaze position. The display may be expanded in a gaze area. Text may be highlighted to indicate last gaze position before the user looked away, making it easy to return to the point of departure. Additional information may be presented regarding a topic on which the gaze of a user paused. The additional information may be text, visual, or sound.

Weinblatt in U.S. Pat. No. 4,075,657 describes an apparatus for tracking eye movement in response to visual stimuli, such as advertising, on a screen.

Jakob Nielsen in "Non Command User Interfaces," published in Communications of the ACM, April 1993 vol. 36, No. 4 pp. 93-94 describes use of eye tracking data as a potential input device for a paddleball video game. He also describes an application in which information presented in a window is updated whenever a user looks from some other point, to the window. The window is updated to contain information about the last point viewed before looking to the window. In another application a speech synthesized narration is changed to go into more detail about a feature on the screen to which a user starts to pay special attention as deduced from the user's eye movement.

N. Hari Narayanan in "Exploiting Gaze Data for the Analysis and Synthesis of Visual Interactions," published as a research report of the Visual Information, Intelligence & Interaction Research Group of the Department of Computer Science & Engineering of Auburn University, Auburn, Ala. describes using gaze parameters from eye tracking data, in conjunction with speech and haptic inputs to control an interactive system and navigate through it.

Kado et al. in U.S. Pat. No. 5,410,609, which is hereby incorporated by reference in its entirety, describe an apparatus for identification of individuals which involves inputting a facial image of an individual. The image is compared to a database of expressionless images of individuals and difference vectors determined. Movement vectors for expression muscles are stored in a database of expression muscles for each of the individuals. Expression muscles are used when facial expressions are made. A judgement is then made as to whether or not the difference vectors are due to the expression muscles.

Other identification methods for individuals involve taking an image of the iris of an eye of an individual. For example IBM and Schiphol Group have announced an airport security system using a camera and software components to compare a person's iris with data stored on a smart card. See, for example, the articles "IBM to Unveil Biometric Pact," by K. Delaney and P. Prada in the *Wall Street Journal* Apr. 25, 2002 page D-5, and the press release "IBM Looks Airline Security in the Eye," Apr. 25, 2002 which is incorporated herein by reference.

During a presentation, the presenting party receives both spoken and non-verbal feedback from the client. An astute presenting party will make use of such feedback to alter the presentation by, for example, emphasizing a particular point, or providing additional information on some aspect than would otherwise be provided. However, the presenting party frequently misses some non-verbal feedback because the demands of making the presentation have the presenting party looking elsewhere than at the client at the time a non-verbal facial expression, or gesture or other non-verbal feedback sign is made. Furthermore, although eye contact with the client may be desirable in certain circumstances, continuous staring at the client may be considered impolite or undesirable for other reasons. Also it may be difficult or impossible to simultaneously observe all of the members of a client team.

An improved method of presenting a proposed business opportunity to a client which makes use of non-verbal feedback would therefore constitute an advancement in the business proposal arts.

OBJECTS AND SUMMARY OF THE INVENTION

It is therefore, a principal object of the present invention to enhance the business proposal arts by providing a system with enhanced presentation capabilities.

It is another object to provide such a system wherein enhanced operational capabilities are possible.

It is yet another object of the invention to provide a method for presenting a business proposal with enhanced capabilities.

These and other objects are attained in accordance with one embodiment of the invention wherein there is provided a method of presenting a business opportunity proposal to a client, comprising the steps of, providing a visual display tool having a display device, a business modeling capability with parameters, an image capture device, and an attentive technology analyzer, presenting a business opportunity using the display device and the business modeling capability, to the client, while presenting, capturing an image of the client with the image capture device, analyzing the image with the attentive technology analyzer, and during the presenting, modifying the parameters in response to the analyzing to drive the business modeling capability to alter the business opportunity.

In accordance with another embodiment of the invention there is provided a system for presenting a business opportunity proposal to a client, comprising, a computing device, a visual display device attached to the computing device, for showing a presentation to a client, an image capture device attached to the computing device, for capturing an image of the client during the presentation, a business modeling capability having adjustable parameters, installed on the computing device, attentive technology software installed on the computing device, for analyzing the image, and presentation software installed on the computing device, adapted for presenting the business modeling capability to the client, while also adjusting the parameters in response to the analyzing of the image.

In accordance with yet another embodiment of the present invention there is provided a computer program product for instructing a processor to show a business opportunity proposal to a client, said computer program product comprising, a computer readable medium, first program instruction means for analyzing a business model of the opportunity, with parameters, second program instruction means for showing the business model to the client, third program instruction means for capturing an image of the client from an image capture device, fourth program instruction means for analyzing the image, and fifth program instruction means for modifying the parameters in response to the analyzing of the image while showing the business model to the client, and wherein all of the program instruction means are recorded on the medium.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
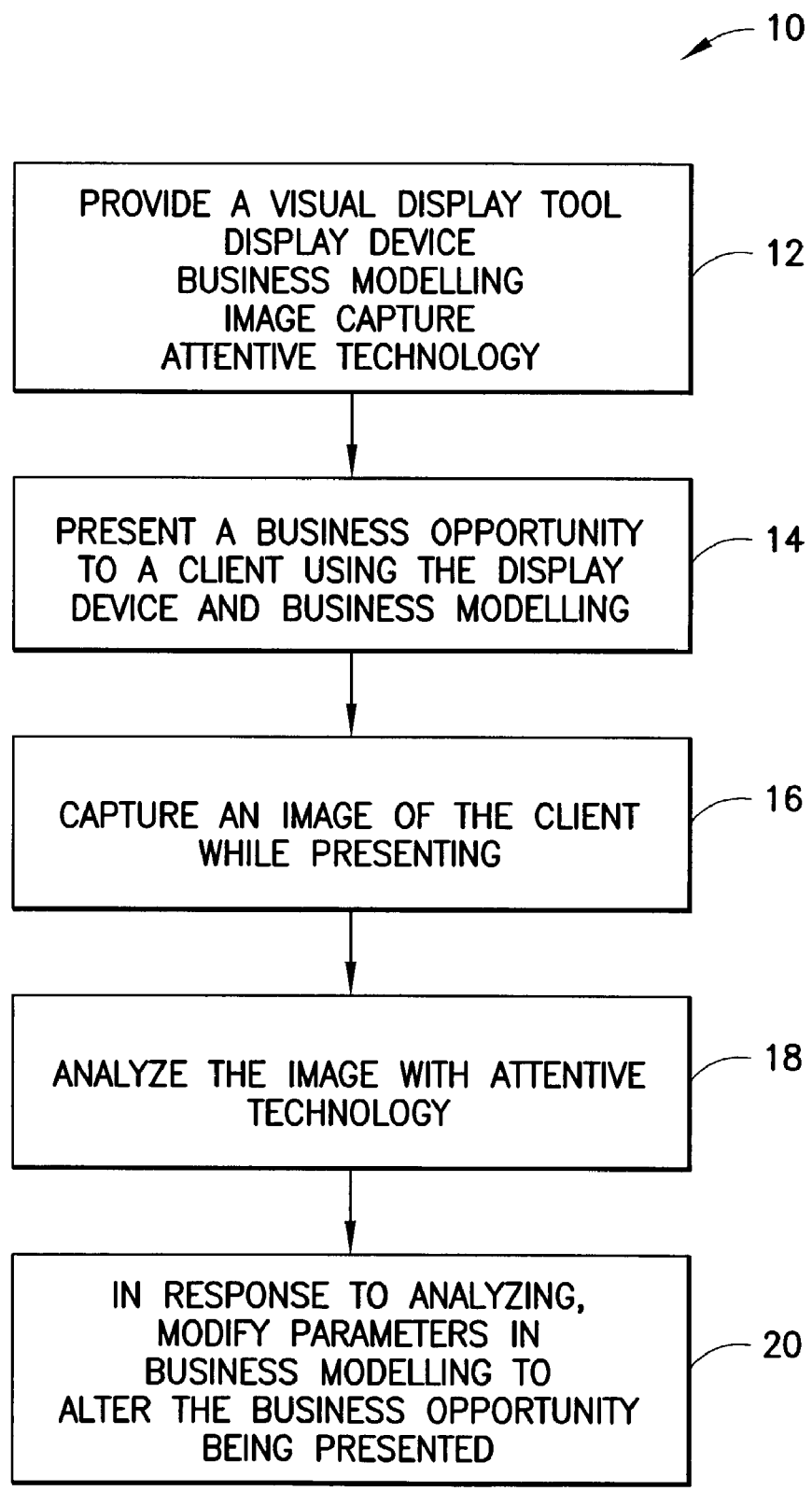
FIG. 1 is a flowchart illustrating the various steps in presenting a business opportunity proposal to a client according to one embodiment of the invention.

In FIG. 1 there is shown a flowchart of steps in accordance with one embodiment of the present invention. In step 12 a visual display tool is provided. The tool includes a display device which may be a display screen on a laptop computer, or a cathode ray tube (CRT) display, or a computer driven digital projector, or a display screen on a palmtop, hand held, cell phone, or any other type of device having a display screen.

The display tool also has a business modeling capability. Such capability may comprise software running on a computing device, for example, spreadsheet software running on a computing device. The computing device may also be driving the display device. The business modeling capability includes parameters having values that are adjustable. The parameters may be variables or constants within a business model. If the business model is a spreadsheet, then the parameters may be numbers entered in specific cells of the spreadsheet. A parameter may also be a number in a formula that is entered in a spreadsheet cell. The spreadsheet may be calculating an ROI, NPV, or other business modeling calculations. After a parameter is entered or altered, a new calculation of ROI, NPV, etc. may then be made by the spreadsheet model.

Figure 2:
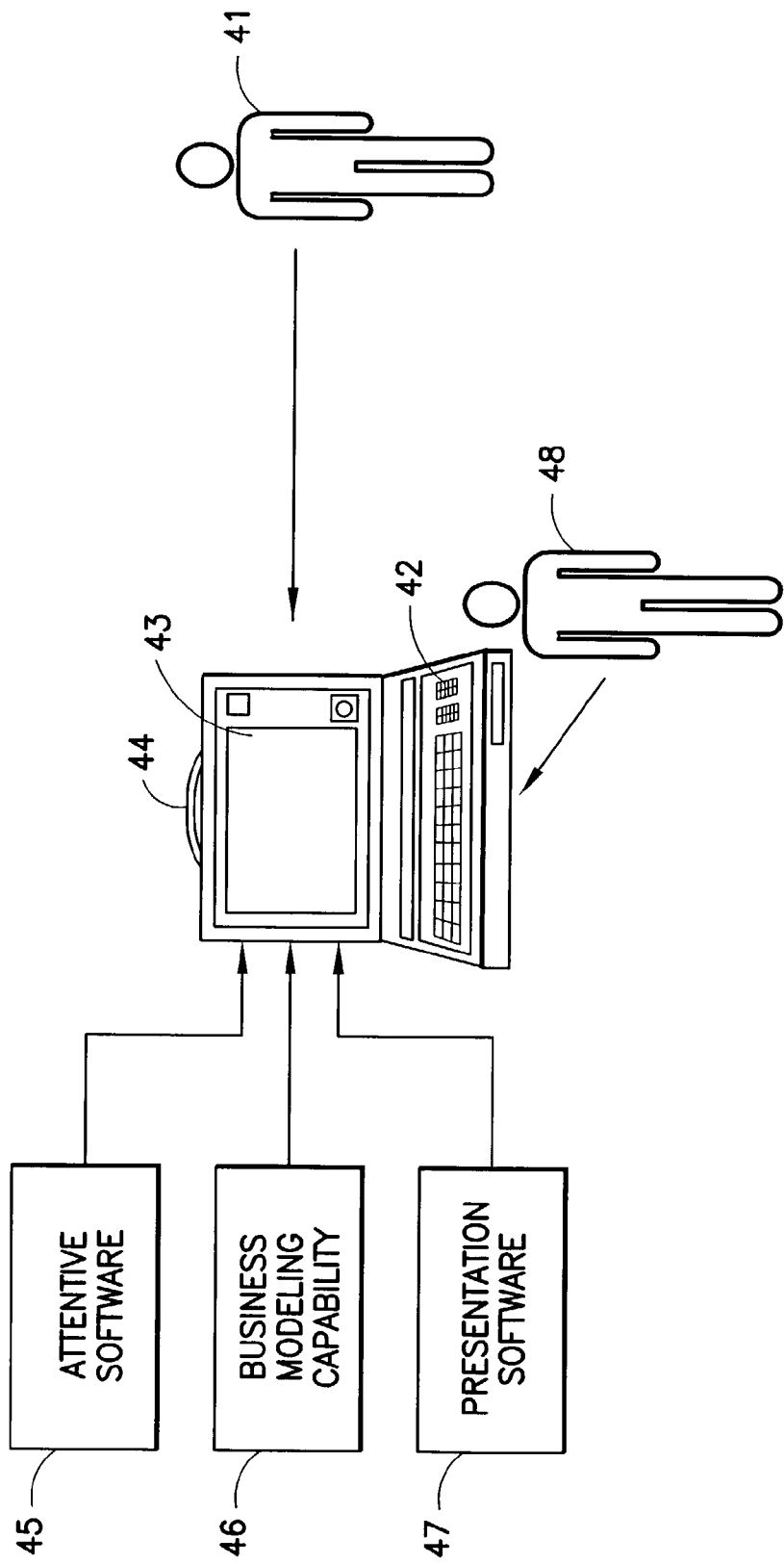
FIG. 2 is a diagram illustrating the various elements of a system for presenting a business opportunity according to an embodiment of the invention.

The visual display tool also includes an image capture device such as a digital camera, video camera, VCR (video cassette recorder) camera, television camera, or the like. The image capture device may be attached to the display device, as shown in FIG. 2, described below. It may also be one or more separate cameras which can be oriented or aimed in any desired manner such as at a client or clients' face, torso, side, or back. The image capture device is capable of taking an image such as a single picture, or a sequence of pictures, or a continuous video stream of pictures.

The visual display tool also includes an attentive technology analyzer for analyzing images from the image capture device. This analyzer may be any software, hardware, or combination capable of performing an analysis of the image for the purpose of modifying the parameters in the business model. In one embodiment the analyzer senses eye movement such as position, gaze, fixations, and saccades. The analyzer may also sense facial expressions, such as smile, frown, grimace, cry or any other type of facial expression. Gestures, whether of the hand or any body part as well as body motion may also be sensed and analyzed. The analyzer may also detect through analysis of the images a cued event situation which is defined herein to mean any human condition or response such as lack of interest, lack of understanding, discomfort with the material presented on the display device, mistrust, agreement, pleasure and the like. The cued event situation may be detected in one embodiment by a logic-based detection of condition cues such as eye focus, pupil dilation, blink rate, or any combination of eye movement, facial expression, gesture, or body motion, or any other analysis of the image from the image capture device. Patterns of movement or cues may be used to detect cued event situations.

In step 14 a business opportunity is presented to a client using the display device and business modeling capability. For example, a presenting party may be showing a spreadsheet model of a business opportunity involving an initial investment in one year and projected sales revenues in following years. While the presenting party is presenting to a client, an image of the client is captured in step 16 using the image capture device. As explained above, the client may be a single individual or a client team. The client may be viewing the presentation on any type of display device and one or more cameras may be used to capture the image.

In step 18 the image is analyzed using the attentive technology analyzer using techniques described above. Other techniques known in the attentive technoloy arts may be used as well as commonly known or psychologically known meanings of facial expression, gestures, body motions, as well as eye movements. For example an up and down motion of the face is generally accepted in most but not all cultures to mean agreement. Certain patterns of movement of facial expression muscles may be analyzed to determine disagreement, discomfort, and the like. In response to the analyzing, parameters in the business modeling capability are modified in step 20 to alter the business opportunity being presented. For example, in one embodiment the analyzer may detect a cued event situation and display an onscreen alert notification such as an icon. The presenting party is trained to respond to the onscreen alert notification to take some type of action. The action may be to change certain parameters in the business modeling capability that the client is responding to. The presenting party may also engage the client in active dialogue to discover the source of the cued event situation. In one embodiment one or more parameters may be automatically increased or decreased in response to a cued event situation without intervention of the presenting party.

Use of the present invention therefore creates a more free-flowing and collaborative work environment for the client and presenting party by expanding the non-verbal communication opportunity which occurs. This more effective collaboration with a client permits the presenting party to more quickly reach agreement or close on a business opportunity proposal with the client.

In FIG. 2 there is shown a system for presenting a business opportunity proposal to a client in accordance with the present invention. Computing device 42 has visual display device 43 attached. The display device may be directly attached e.g. as shown in FIG. 2 as with a laptop computer. Display device 43 may also be attached to computing device 42 through a cable, network connection, wireless connection or any other type of attachment known in the art which permits computing device 42 or software loaded thereon to drive display device 43.

Image capture device 44 as described above is also attached using any type of attachment or connection, to computing device 42. This capture device would normally be oriented for capturing an image of client 48 during a presentation. The image may be a video stream. Client 48 would normally be positioned to face or view display device 43 as shown, however any arrangement of display device 43, image capture device 44 and client is possible.

Business modeling capability 46 is installed on computing device 42 and comprises software or hardware for performing business model calculations in response to adjustable parameters. In one embodiment, capability 46 is a spreadsheet adapted for performing an ROI model calculation.

Attentive technology software 45 is also installed on computing device 42. Software 45 analyzes the image. The analyzing may include eye movement, facial expression, gestures and body motion. Analyzing may also be capable of detecting a cued event situation as described above. Attentive technology software 45 may be adapted to show an alert notification, such as an icon on display device 43 when a cued event situation is detected. Other types of alert notification to presenting party 41, such as a private audio alert sent to an earphone device worn by representing party 41 may also be used, whether or not client 48 has access to the alert.

Presentation software 47 is also installed on computing device 42. It is adapted for presenting business modeling capability 46 to client 48, while also adjusting parameters in the business model in response to the analyzing of attentive software 45. In one embodiment, presentation software 47 and business modeling capability 46 may be combined as a single spreadsheet program. Presentation software 47 may also be adapted to automatically modify parameters in business modeling capability 46 in response to a cued event situation detected by attentive software 45.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of presenting a business opportunity proposal by a presenting party to a client team, comprising the steps of:
providing a visual display tool having a display device, a business modeling capability including a spreadsheet with parameters, an image capture device, and an attentive technology analyzer;
presenting said business opportunity proposal by said presenting party to said client team using said display device and said business modeling capability;
while said presenting party is presenting, capturing an image of said client team with said image capture device;
analyzing said image for two or more of the following: eye movement, facial expression, gestures, or body motion, with said attentive technology analyzer; and during said presenting by said presenting party, modifying said parameters in said spreadsheet in response to said analyzing to drive said business modeling capability to alter said business opportunity proposal.

2. The method of claim 1, wherein said visual display tool is a laptop computer.

3. The method of claim 1, wherein said display device is a digital projector.

4. The method of claim 1, wherein said image is a video stream.

5. The method of claim 1, wherein said attentive technology analyzer is adapted to detect a cued event situation.

6. The method of claim 5, wherein said cued event situation is lack of interest, lack of understanding, discomfort, or mistrust, or combinations thereof.

7. The method of claim 5, further comprising displaying an onscreen alert notification of said cued event situation.

8. The method of claim 5, wherein said modifying comprises an automatic increase or decrease in one or more of said parameters in response to said cued event situation.

9. A system for presenting a business opportunity proposal by a presenting party to a client team, comprising:
   a computing device;
   a visual display device attached to said computing device, for showing by said presenting party, a presentation to said client team;
   an image capture device attached to said computing device, for capturing an image of said client team during said presentation; by said presenting party;
   a business modeling capability including a spreadsheet having adjustable parameters, installed on said computing device;
   attentive technology software installed on said computing device, for analyzing said image for two or more of the following: eye movement, facial expression, gestures, or body motion; and
   presentation software installed on said computing device, adapted for presenting by said presenting party, said business modeling capability to said client, while also adjusting said parameters in said spreadsheet in response to said analyzing of said image.

10. The system of claim 9, wherein said computing device is a laptop computer.

11. The system of claim 9, wherein said visual display device is a digital projector.

12. The system of claim 9, wherein said business modeling capability is an ROI spreadsheet tool.

13. The system of claim 9, wherein said image is a video stream.

14. The system of claim 9, wherein said attentive technology software is adapted to detect a cued event situation.

15. The system of claim 14, wherein said attentive technology software is adapted to display on said visual display device, an alert notification of said cued event situation.

16. The system of claim 14, wherein said presentation software is adapted to automatically increase or decrease one or more of said parameters in response to said cued event situation.

17. A computer program product for instructing a processor to generate a business opportunity proposal for presenting by a presenting party, to a client team, said computer program product comprising:
   a computer readable medium;
   first program instruction means for analyzing a business model including a spreadsheet having parameters, of said opportunity;
   second program instruction means for displaying said business model including said spreadsheet on a display device;
   third program instruction means for capturing an image of said client team from an image capture device while said presenting party is presenting said business opportunity proposal to said client team
   fourth program instruction means for analyzing said image for two more of the following: eye movement, facial expression, gestures or body motion; and
   fifth program instruction means for modifying said parameters in said spreadsheet in response to said analyzing of said image while said presenting party is presenting said business model to said client team; and wherein
   all of said program instruction means are recorded on said medium.

18. The computer program product of claim 17, wherein said image is a video stream.

* * * * *

UNITED STATES PATENT AND TRADEMARK OFFICE
CERTIFICATE OF CORRECTION

PATENT NO.       : 7,624,023 B2                                         Page 1 of 1
APPLICATION NO.  : 10/162782
DATED            : November 24, 2009
INVENTOR(S)      : Clay et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1917 days.

Signed and Sealed this

Twenty-sixth Day of October, 2010

David J. Kappos
*Director of the United States Patent and Trademark Office*